(12) United States Patent
Tiberi (10) Patent No.: US 9,148,494 B1
(45) Date of Patent: Sep. 29, 2015

(54) FONT LOADING SYSTEM AND METHOD IN A CLIENT-SERVER ARCHITECTURE

(71) Applicant: WORKIVA INC., Ames, IA (US)

(72) Inventor: Bovard Tiberi, Ames, IA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 14/332,376

(22) Filed: Jul. 15, 2014

(51) Int. Cl.
  *G06F 17/00* (2006.01)
  *H04L 29/06* (2006.01)
  *G06F 17/21* (2006.01)

(52) U.S. Cl.
  CPC .............. *H04L 67/42* (2013.01); *G06F 17/212* (2013.01); *G06F 17/214* (2013.01)

(58) Field of Classification Search
  CPC .............................. G06F 17/212; G06F 17/214
  USPC ............... 715/269; 345/23–25, 947; 358/1.11
  See application file for complete search history.

(56) References Cited

U.S. PATENT DOCUMENTS

| | | | | |
|---|---|---|---|---|
| 5,689,724 | A * | 11/1997 | Morgan et al. | 715/205 |
| 7,228,501 | B2 * | 6/2007 | Brown et al. | 715/234 |
| 2003/0095135 | A1 * | 5/2003 | Kaasila et al. | 345/613 |
| 2003/0167158 | A1 * | 9/2003 | Seed | 703/11 |
| 2012/0110436 | A1 * | 5/2012 | Adler et al. | 715/234 |
| 2013/0325795 | A1 * | 12/2013 | Harris et al. | 707/608 |

OTHER PUBLICATIONS

Joan Wardell, "Test Your Mapping", @006-10-28, http://scripts.sil.org/UTTTestMap, pp. 5.*

* cited by examiner

*Primary Examiner* — Chau Nguyen
(74) *Attorney, Agent, or Firm* — Drinker Biddle & Reath LLP (57) ABSTRACT

Disclosed herein is a system and related method for downloading fonts associated with a document in a client-server architecture. On a client side the client is: receiving some of the document to reproduce; retrieving fonts needed to display a page of the document on the client device by: requesting a font loader to load a requested font; determining if the font is loaded by: determining a valid test character of the font that is a viewable character; attempting to draw the test character in a small portion of a display screen of the client device; recording a width of the drawn character; determining that the test character was written in the requested font if its character width is not equal to zero; and determining that the test character was written in a fallback font if its character width is equal to zero.

20 Claims, 5 Drawing Sheets

| 220 | 230 | 240 | 250 | | | 260 | 270 |
|---|---|---|---|---|---|---|---|
| | | | 258 | 254 256 | 252 | | |
| 110 | 173 | 235 | 298 | | | 2fbbb3-dd549ff.png | S2 |
| 111 | 174 | 236 | 299 | | | 2fbbb3-df44e88.png | S3 |
| 112 | 175 | 237 | 2fbbb3-06db40d | | | 2fbbb3-e8641b8 | S4 |
| 113 | 176 | 238 | 2fbbb3-073f3ad.png | | | 2fbbb3-e8e0ef1.png | S5 |
| 114 | 177 | 239 | 2fbbb3-07f93e6.png | | | 2fbbb3-e8ede96.png | S6 |

FONT LOADING SYSTEM AND METHOD IN A CLIENT-SERVER ARCHITECTURE

BACKGROUND

Documents that are displayed on devices must be able to correctly load and interpret the fonts that are used within the document. In order to have the document display in a manner that is acceptable to a user, downloading and collecting the necessary fonts for display on a page should be done quickly and efficiently.

Providing such efficient font loading has proven difficult, particularly for PDF fonts, since the font sets associated with pages and documents may not contain a full and standardized set of fonts.

SUMMARY

Disclosed herein is a system and related method for downloading fonts associated with a document in a client-server architecture, comprising: on a server side: parsing a document with a processor and extracting information for reconstructing it on a client device, including at least font information; storing the extracted information in a database of the server. On a client side the client is: receiving some or all of the document to reproduce over a network connection that connects a receiving client device to the server; retrieving fonts needed to display a page of the document on the client device by: requesting a font loader to load a requested font; determining if the font is loaded by: determining a valid test character of the font that is a viewable character; attempting to draw the test character in a small portion of a display screen of the client device; recording a width of the drawn character; determining that the test character was written in the requested font if its character width is not equal to zero; and determining that the test character was written in a fallback font if its character width is equal to zero.

DESCRIPTION OF THE DRAWINGS

The drawings illustrate various embodiments of the invention, in which:

FIG. 3A is an exemplary database structure containing page display instruction records;

DETAILED DESCRIPTION

Figure 1:
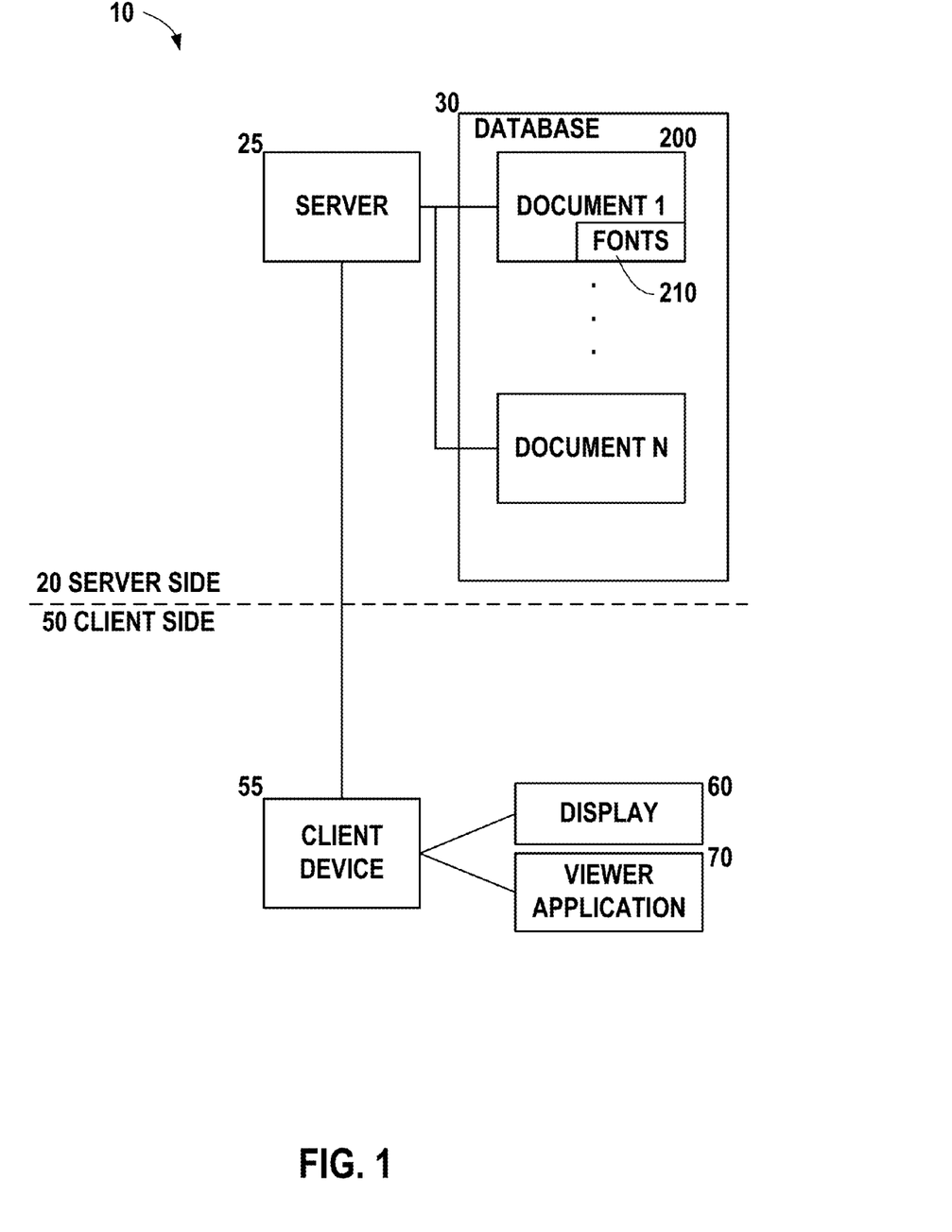
FIG. 1 is a block diagram showing a basic configuration of an exemplary client server architecture.

FIG. 1 is an exemplary basic block diagram illustrating a client-server architecture for a system 10 in which a server 25 on a server side 20 of the system maintains documents 200 and document drawing instructions stored in a database 30. The documents contain pages that are processed by the server to form the database 30 including the drawings instructions for client devices 55 so that the client device can properly display the pages. These instructions include fonts and pictures along with specific layout instructions (coordinates/positions) so that the client device 55 on the client side 50 can properly present pages on a display 60 using a viewer application 70.

When a document page comes down, the server 25 parses through the page and extracts the images and fonts from the document pages and creates the drawing instructions (see FIGS. 3A, 3B) that the client 55 needs to reproduce the documents, storing them in the database 30. The extracted fonts are thus tied to the documents that they came from.

Figure 2A:
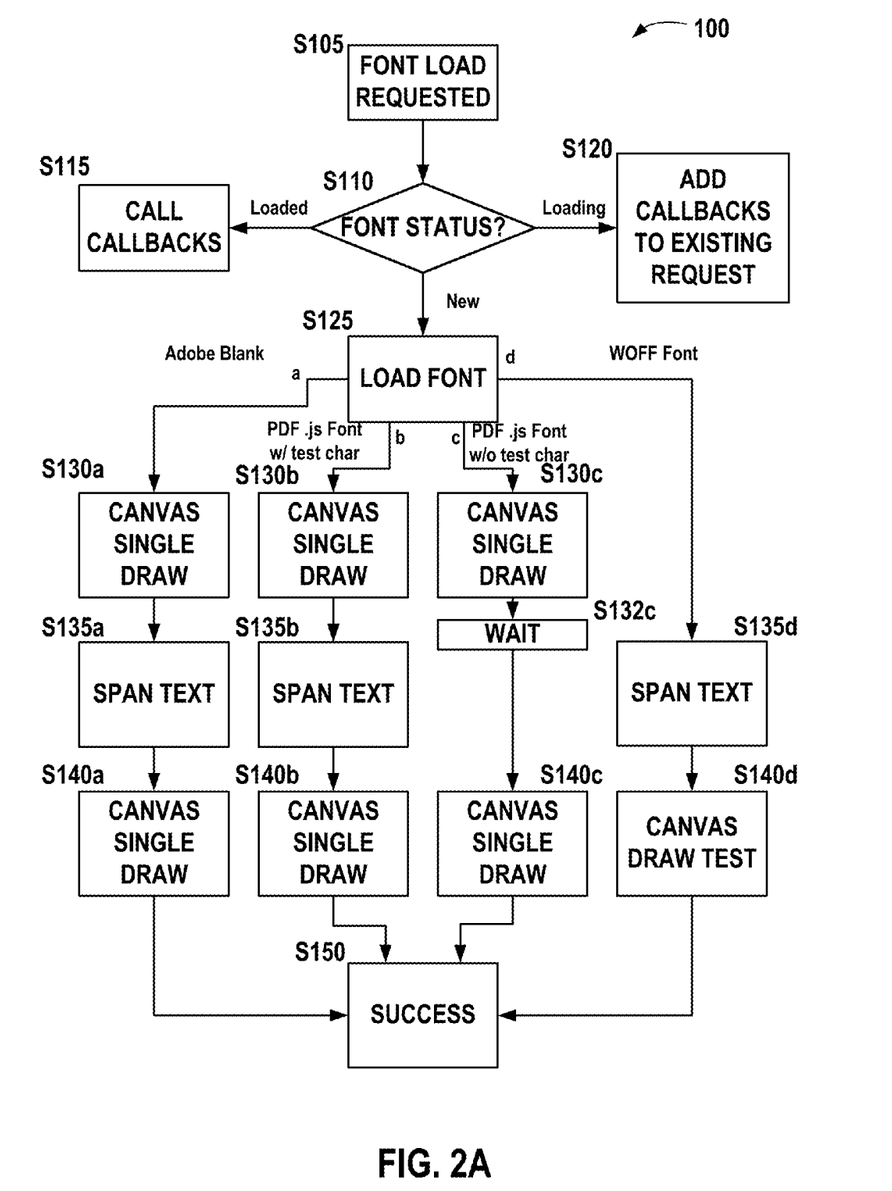
FIG. 2A is a flowchart illustrating an exemplary font download process.

FIG. 2A illustrates an embodiment of the inventive method 100. When a document or a page of a document is being downloaded from the server 25 to the client device 55. Before drawing any text on a canvas (display 60), it must first be ensured that the font being written is properly loaded. If the font is not properly loaded, the text display will not be accurate and information will not display correctly.

When a font load for a document is requested S105 by the client device 55 the font loader makes a call to load the font from the server 25. This call by the font loader can be a simple Ajax.Request call, or it can be a @font-face call (from Cascading Style Sheets standard definition) to load the font from the server 25. Once this call to load the font from the server 25 is complete, the page model asks the font loader to load the font. When that requested load is done, then the callback to the page model occurs, and the page model renders the page.

The font load status can be one of loaded, loading, or new (a request for a font that is not either loaded or loading) with respect to the client device 55. The callback can simply be thought of as the equivalent of a telephone number that says, "once the process is complete, please call back this number", except the java script callback in this situation is to a handler process that indicates what is to occur on the client device 55 once the font is loaded.

If the font is a new font, then a number of additional steps must be performed. First, a load font routine S125 is called that determines the type of font being requested. The fonts are broken down into two broad categories: PDF fonts (paths a, b, and c), and Web Open Font Format (WOFF) fonts, as defined by the W3C Recommendation (path d). The PDF fonts can be one of: an Adobe Blank (path a, in FIG. 2), a PDF.js Font (a Mozilla open source web standards-based platform for parsing and rendering Adobe Portable Document Format (PDFs) in an HTML5 context) with a test character (path b), and a PDF.js Font without a test character (path c).

The PDF.js Fonts (or fonts generated from the PDF.js Mozilla PDF project) are difficult to deal with because they are variable in size and may just have specific (even just one or two) characters, and may be embedded on the page in a variety of different formats, and PDF.js then pulls out the font definitions and sticks them into the head filetag. Since the server 25 is used in this system to extract the font definitions, the server 25 scrapes them out of the head filetag, and these can be saved off as a base-64 encoded string. These fonts may define Unicode characters (i.e., those above traditional 8-bit character sets), and particularly glyphs, in high Unicode ranges. Furthermore, character mappings may be done into high Unicode ranges as opposed to their more traditional locations in standardized fonts.

As described at http://sourceforge.net/adobe/adobe-blank/wiki/About/, downloaded Jul. 24, 2014, Adobe Blank is a known special-purpose OpenType font that is based on the Adobe-Identity-0 ROS (ROS stands for /Registry, /Ordering, and /Supplement, and refers to the /CIDSystemInfo dictionary entries that define the glyph set name for CID-based character collections). The Adobe-Identity-0 ROS is a special-purpose character collection whose use is not tied to a specific language, and Adobe Blank is a special-purpose OpenType font that is intended to render all Unicode code points using non-spacing and non-marking glyph. The Adobe Blank OpenType font maps 1,111,998 Unicode code points to its 2,048 non-spacing and non-marking glyphs. The 2,048 High and Low Surrogates (U+D800 through U+DFFF), the two noncharacters in the BMP and in each of the 16 Supplementary Planes (FFFE and FFFF), and the 32 noncharacters in the range U+FDD0 through U+FDEF are explicitly and intentionally excluded. As a fully-functional OpenType font, the following 10 'sfnt' tables are included: CFF, DSIG, OS/2, cmap, head, hhea, hmtx, maxp, name, and post.

If the new font is a WOFF font, a "WF_" prefix may be added to the requested font to ensure that it does not collide with any of the other font names and to distinguish it as a WOFF font. For example, there may be two different fonts designated as "Arial" and originating from different sources (WOFF and PDF). This could cause a collision in the event that the Arial font is called out, unless a distinction is made between the two. The @font-face declaration is added as well. This is done using traditional font-based URL loading methods. Then, the client 55 waits for the font to load from the server 25. The WOFF fonts are easier to deal with than the PDF fonts because they are defined in a well behaved and consistent manner—there are only a set number of them, and the font sets are better defined (A-Z, a-z, 0-9, special characters). In contrast, a PDF font could potentially define a single character, if that is all that is needed for a document.

It is possible that the font may fail to load for any number of reasons. If it does, the client 55 can attempt to download the font some designated number of times (MAX_RETRIES) before determining the font cannot be downloaded from the server 25 and that the font load request resulted in an ultimate failure.

Before the PDF.js fonts are sent down to the client 55 by the server 25 at process time, i.e., when the server 25 is generating canvas draw instructions, every font has been looked at to try to find a valid test character that is known to be within the font. Valid test characters do not include characters that are not viewable to a user when drawn (e.g., space, new line NL, non-breaking space, tab, etc.). Thus, fonts containing a lot of these types of characters make it difficult to locate a valid test character.

If no valid test character can be located (path c), there is little that can be done, because all of the loading mechanisms depend on the fact that when characters are drawn, they are visible—thus, the system cannot be certain it is loading a valid character. In this situation, a canvas single draw S130c is performed, and the system waits (S132c) for some predefined period of time, such as one or one and a half seconds (or some predefined maximum time it should take for a font to actually load). The system then does one more canvas draw at S140c, and then calls the loaded callbacks (S115).

If a valid test character is located (path b), then the span text or span loader testing operation S135b is performed (see FIG. 2B, discussed below), similar to what is done for the WOFF font. When writing with a font, there is a font fallback, and the font fallback is explicitly set to be a specific well-established font, i.e., one with all of the regular and special characters defined, and these are all defined with zero-width characters. A viewable character is chosen, and a further canvas single draw (S140b) is performed.

Figure 2B:
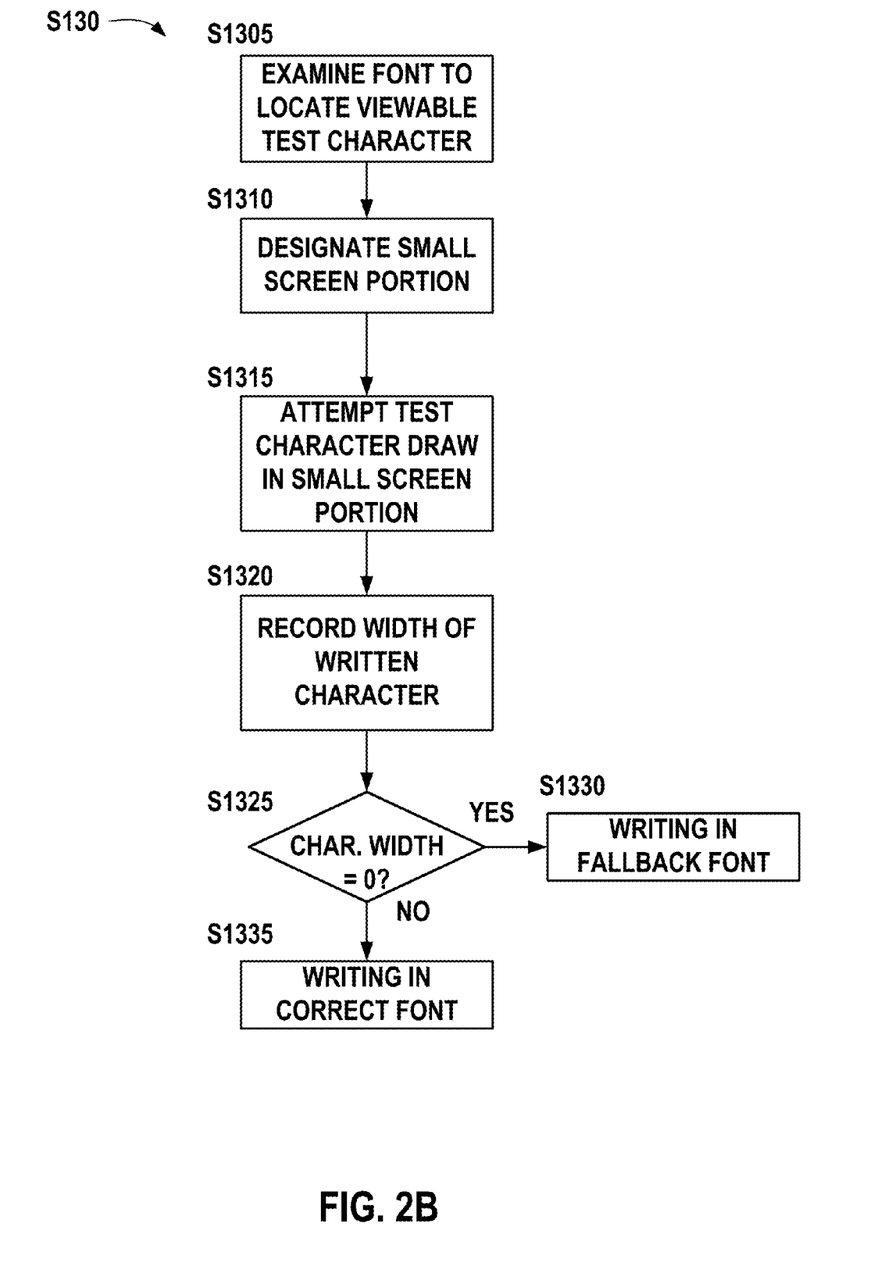
FIG. 2B is a flowchart illustrating an exemplary canvas single draw procedure.

Once some of the data for the font is downloaded, in the case of paths a, b, and c, for PDF files an attempt is made to perform a canvas single draw S130a, b, c. This is not needed with the WOFF font because its definition is known, based on its well-defined font sets. Referring to FIG. 2B, this single draw for PDF fonts S130 can comprise examining the font to locate a viewable test character S1305 (as described above), and then designating a small and invisible or relatively invisible portion of the canvas/screen to kick off the font-loading process S1310. The canvas single draw S130a, b, c involves attempting to draw the single test character that is known to be within the font S1315. The font definition must be injected into the head with a style tag—the base-64 encoded version of the font is put into the style tag, i.e., the base 64-encoded font is placed in the src section of the font tag instead of a uri to a location to access the font.

If the font has not loaded, the single draw process S130 defaults to a fallback font (e.g., Adobe Blank), having zero width. The width of the written character is recorded S1320, and if it is zero S1325 (yes), then the routine knows that it is still writing in the fallback font s1330, and if it is non-zero, then the routine knows that it is not the fallback font anymore s1335, and can thereby conclude that all of the font characters have been loaded. When it is determined that the test character is written in the fallback font, the canvas single draw S130 can be performed for some predefined number of times as well or for some predefined period of time (again, such as a maximum time that we would expect it to take for a font to load).

In any case, with success S150 or failure, the system then calls the callbacks again S115. The page model has a list of fonts it needs loaded, and it tells the FontLoader to load them all, and requests that the font loader calls them back when each is loaded. When all of these callbacks are returned, the PageModel knows it can draw the page.

Figure 3B:
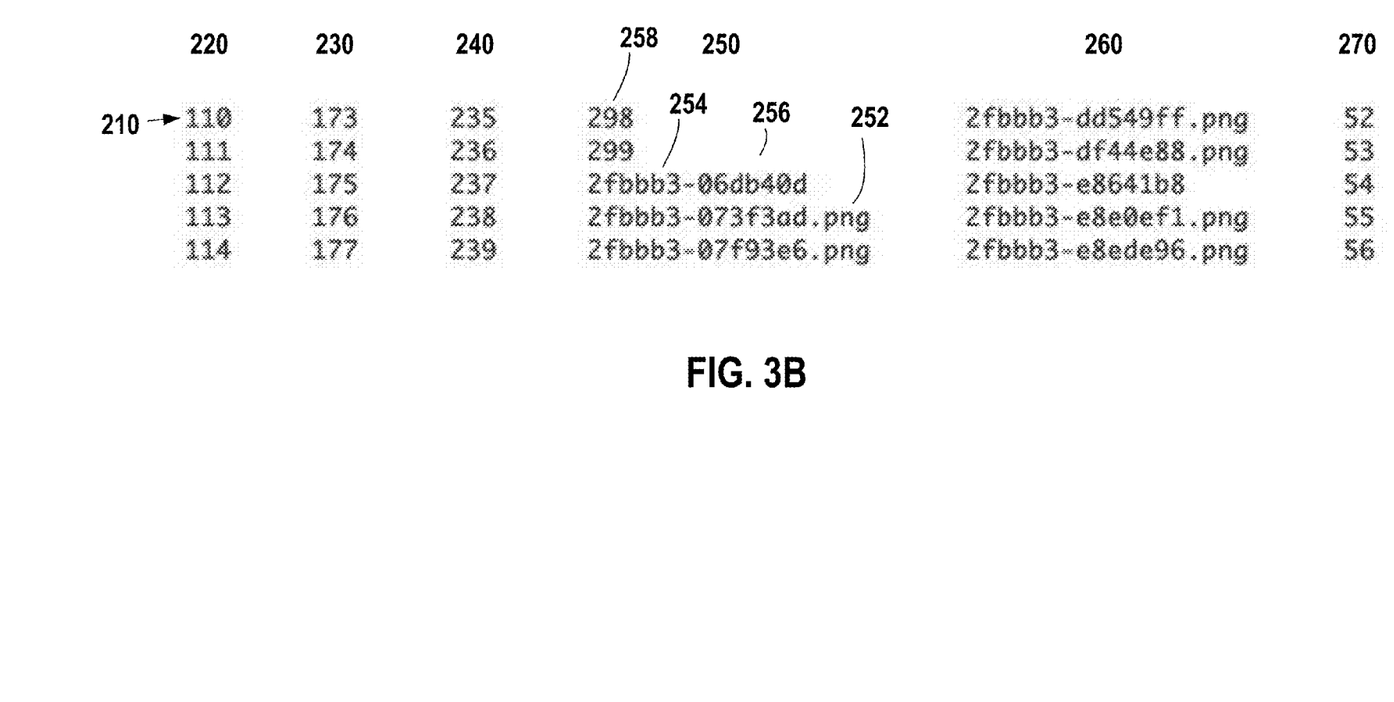
FIG. 3B is a detailed illustration of the database structure in FIG. 3A.

The flow path is identical for paths a and b, and the paths a and c differ only in that path c does a wait instead of a span text operation. FIG. 3A provides an exemplary layout of the database 200 once the canvas draw instructions have been completed for a document comprising various page drawing records 210. FIG. 3B provides a breakdown of the individual page records 210.

In FIG. 3B, the records may contain a page number 220, and a pointer to the instructions to draw the page 250. The entries with an image file type extension (e.g., ".png") 252 are images that are to be drawn on the page on the page, and the fonts 254, 256 are identified without a file extension in a form xxxxxx-yyyyyyy (254, 256), where the first part xxxxxx 254 can be provided as a unique identifier to the document to prevent font collisions. The pages 258 are simply identified by an integer. The entities referenced in FIGS. 3A and B represent screenshots of a list of all the file names of generated artifacts (fonts, pictures, etc.), so the entries referenced by 210, 220, 230, 240, 258, and 270 are all files which contain canvas draw instructions, 252 (and anything ending with .png or other graphic file type extensions) are the images, and 256 is a font. The prefix (254) is a unique identifier.

By using this system, particularly difficult fonts, such as PDF.js fonts, that do not have a fully and consistently defined character set, can be properly handled (i.e., loaded and executed in a timely manner) on client devices.

The Computer Software Listing provided at the end of this descriptive portion provides an exemplary embodiment of code that may be utilized to perform various functions described above. Further functional definitions follow.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc.

When software modules are involved, these software modules may be stored as program instructions or computer readable codes executable on the processor on a non-volatile computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media is readable by the computer, stored in the memory, and executed by the processor.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components that perform the specified functions. For example, the embodiments may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, embodiments of the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

TABLE OF REFERENCE CHARACTERS

10 font loading system
20 system server side
30 server database
50 system client side
55 client device
60 display
70 client viewer application
100 method flow
Sxxx method procedure element
200 documents
Computer Software Listing

```
define([
    'jquery',
    'lodash',
    'wf-js-common/DOMUtil',
    'wf-js-common/console',
    'wf-js-viewer/data/Font',
    'wf-js-viewer/data/font_loader_utils/WOFFFontDataLoader',
    'wf-js-viewer/data/font_loader_utils/PDFFontDataLoader',
    'wf-js-viewer/data/font_loader_utils/BlankFontDataLoader',
    'wf-js-viewer/data/font_loader_utils/SpanTester',
    'wf-js-viewer/data/font_loader_utils/CanvasTester',
    'wf-js-viewer/data/font_loader_utils/CanvasSingleDraw',
    'wf-js-viewer/data/font_loader_utils/Waiter'
], function(
    $,
    _,
    DOMUtil,
    console,
    Font,
    WOFFFontDataLoader,
    PDFFontDataLoader,
    BlankFontDataLoader,
    SpanTester,
    CanvasTester,
    CanvasSingleDraw,
    Waiter
) {
    'usestrict';
    var BASE_URL = '';
    var blankFont;
    var DEFAULT_TEXT =
    '0123456789~@#$%%^*(-_=+[{<?aeiouyAEIOUY';
    var WOFF_SPAN_TIMEOUT = 60000;
    var PDF_SPAN_TIMEOUT = 3000;
    var BAD_PDF_FONT_TIMEOUT = 1500;
```

```
    var BLANK_FONT_NAME = 'AdobeBlank';
    var BLANK_FONT_DEF = {
        fontFamily: BLANK_FONT_NAME,
        fontStyle: 'normal',
        fontWeight: 'normal',
        url: 'data:application/octet-stream;base64,[stream removed from code listing]
        hashKey: 'data-AdobeBlank'
    };
    function isPDFFont(fontDefinition) {
        return fontDefinition.hasOwnProperty('PDFJS') &&
            fontDefinition.PDFJS;
    }
    function isBlankFont(fontDefinition) {
        return fontDefinition.fontFamily === BLANK_FONT_NAME;
    }
    function isWOFFFont(fontDefinition) {
        return !isPDFFont(fontDefinition) && !isBlankFont(fontDefinition);
    }
    function makeFamilyList(fontDefinition) {
        if(isBlankFont(fontDefinition)) {
            return 'AdobeBlank, serif';
        }
        return '"' + fontDefinition.fontFamily + '", AdobeBlank';
    }
    function hasValidTestChar(fontDefinition) {
        if (fontDefinition.testChar === '') {
            return false;
        }
        return fontDefinition.testChar;
    }
    function adjustURL(url) {
        if (!BASE_URL) { return url; }
        if (!url) { return url; }
        if (url.length < 1) { return url; }
        if (isDataURI(url)) { return url; }
        if (url.indexOf(BASE_URL) === -1 {
            if (url [0] !== '/') {
                url = '/' + url;
            }
            return BASE_URL + url;
        }
        return url;
    }
    function isDataURI(uri) {
        return uri.substr(0, 'data:'.length) === 'data:';
    }
    function getTestCharFromUnicode(testChar) {
        console.log('matching testChar ' + testChar);
        if (testChar >= 0) {
            if (testChar <= 0xFFFF) {
                console.log('regular testChar');
                // codePoint >= 0 && codePoint <= 0xFFFF
                return String.fromCharCode(testChar);
            } else {
                console.log('overflow testChar');
                // codePoint > 0xFFFF
                // Please refer to the following MDN article...
                // https://developer.mozilla.org/en-US/docs/Web/JavaScript/Reference/Global_Objects/String/fromCharCode#Getting_it_to_work_with_higher_values
                var offset = testChar - 0x10000;
                var s1 = 0xD800 + (offset >> 10); // Surrogate 1
                var s2 = 0xDC00 + (offset & 0x3FF); // Surrogate 2
                return String.fromCharCode(s1, s2);
            }
        }
        return null;
    }
    function getFontHash(fontDefinition) {
        if (fontDefinition.hashKey) {
            return fontDefinition.hashKey;
        }
        return fontDefinition.url;
    }
    function loadFont(definition, successCallback, failureCallback) {
        var font = getOrCreateFont(definition);
        if (successCallback) {
            font.addSuccessCallback(successCallback);
        }
        if (failureCallback) {
            font.addFailureCallback(failureCallback);
        }
    }
    var fonts = { };
    function getOrCreateFont(fontDefinition) {
        fontDefinition.url = adjustURL(fontDefinition.url);
        // Repair stuff
        if (isWOFFFont(fontDefinition)) {
            // if we haven't already prepended WF_, prepend it
            if (fontDefinition.fontFamily.indexOf('WF_') !== 0) {
                fontDefinition.fontFamily = 'WF_' + fontDefinition.fontFamily;
            }
        }
        // WOFF and Blank Fonts should always use the default text
        if (!isPDFFont(fontDefinition)) {
            fontDefinition.testChar = DEFAULT_TEXT;
        } else {
            // if we're sent in unicode, get the test char
            if (typeof fontDefinition.testChar === 'number') {
                fontDefinition.testChar = getTestCharFromUnicode(fontDefinition.testChar);
            }
        }
        var fontHash = getFontHash(fontDefinition);
        if (!fonts[fontHash]) {
            fonts[fontHash] = createFont(fontDefinition);
        }
        return fonts[fontHash];
    }
    function createFont(fontDefinition) {
        console.log('creating a font');
        var loadImplementation;
        var familyList = makeFamilyList(fontDefinition);
        var spanTester = new SpanTester(
            familyList,
            fontDefinition.fontWeight,
            fontDefinition.fontStyle,
            fontDefinition.testChar
        );
        var canvasTester = new CanvasTester(
            familyList,
            fontDefinition.fontWeight,
            fontDefinition.fontStyle,
            fontDefinition.testChar
        );
        var canvassSingleDraw = new CanvasSingleDraw(
            familyList,
            fontDefinition.fontWeight,
            fontDefinition.fontStyle,
            fontDefinition.testChar
        );
        var waiter = new Waiter( );
        if (isBlankFont(fontDefinition)) {
            // ADOBE BLANK
            spanTester.setTestFunction(function(value) {
                console.log('testing Blank Font');
                return value === 0;
            });
            loadImplementation = function(font) {
                return new BlankFontDataLoader( ).load(fontDefinition)
                    .then(function( ) {return canvasSingleDraw.draw( );})
                    .then(function( ) {return spanTester.test( );})
                    .then(function( ) {return canvasSingleDraw.draw( );})
                    .then(function( ) {font.enterLoaded( );})
                    .fail(function( ) {font.enterFailed( );});
            };
        } else if (isPDFFont(fontDefinition) &&
            hasValidTestChar(fontDefinition))
        {
            // PDFJS with good test char
            console.log('loading a PDFJS font ' + fontDefinition.fontFamily);
            spanTester.setTestFunction(function(value) {
                console.log('testing PDFJS font with test Char ' +
```

```
            fontDefinition.testChar);
        return value > 0;
    });
    loadImplementation = function(font) {
        blankFont.addSuccessCallback(function( ) {
            return new PDFFontDataLoader( ).load(fontDefinition)
                .then(function( ) {
                    console.log('drawing once for PDF');
                    return canvasSingleDraw.draw( );
                }).then(function( ) {
                    console.log('span testing for PDF');
                    // some fonts with bad test chars will sneak in here
                    // so need to keep this number low
                    return spanTester.test(PDF_SPAN_TIMEOUT);
                }).then(function( ) {
                    console.log('drawing once for PDF');
                    return canvasSingleDraw.draw( );
                }).then(function( ) {
                    console.log('loading');
                    font.enterLoaded( );
                }).fail(function( ) {
                    console.log('failing');
                    font.enterFailed( );
                });
        });
        blankFont.addFailureCallback(function( ) {
            font.enterFailed( );
        });
    };
} else if (isPDFFont(fontDefinition)) {
    console.log('loading a PDFJS font with bad test Char ' +
        fontDefinition.fontFamily);
    loadImplementation = function(font) {
        blankFont.addSuccessCallback(function( ) {
            return new PDFFontDataLoader( ).load(fontDefinition)
                .then(function( ) {
                    console.log('drawing once for PDF');
                    return canvasSingleDraw.draw( );
                }).then(function( ) {
                    console.log('stalling PDF');
                    return waiter.stall(BAD_PDF_FONT_TIMEOUT);
                }).then(function( ) {
                    console.log('drawing once for PDF');
                    return canvasSingleDraw.draw( );
                }).then(function( ) {
                    console.log('loading');
                    font.enterLoaded( );
                }).fail(function( ) {
                    console.log('failing');
                    font.enterFailed( );
                });
        });
        blankFont.addFailureCallback(function( ) {
            font.enterFailed( );
        });
    };
} else if (isWOFFFont(fontDefinition)) {
    // WOFF
    console.log('loading a WOFF font ' + fontDefinition.fontFamily);
    spanTester.setTestFunction(function(value) {
        console.log('testing WOFF font ');
        return value > fontDefinition.testChar.length;
    });
    loadImplementation = function(font) {
        blankFont.addSuccessCallback(function( ) {
            return WOFFFontDataLoader.load(fontDefinition)
                .then(function( ) { return
                    spanTester.test(WOFF_SPAN_TIMEOUT);})
                .then(function( ) { return canvasTester.test( );})
                .then(function( ) {font.enterLoaded( );})
                .fail(function( ) {font.enterFailed( );});
        });
        blankFont.addFailureCallback(function( ) {
            font.enterFailed( );
        });
    };
} else {
    console.log('INVALID FONT!');
    throw 'Font was not of expected type';
}
var font = new Font(fontDefinition, loadImplementation);
if (fontDefinition.fontFamily === 'AdobeBlank') {
    blankFont = font;
}
font.load( );
return font;
}
function changeBaseURL(baseURL) {
    if (!baseURL || baseURL.length === 0) {
        console.log('setting base_url to blank');
        BASE_URL = '';
    } else if (baseURL[baseURL.length - 1] === '/') {
        BASE_URL = baseURL.substr(0, baseURL.length - 1);
    } else {
        BASE_URL = baseURL;
    }
    loadFont(BLANK_FONT_DEF);
}
function changeWOFFSpanTimeout(timeout) {
    WOFF_SPAN_TIMEOUT = timeout;
}
return {
    load: loadFont,
    CHANGE_BASE_URL: changeBaseURL,
    _GET_URL: adjustURL,
    CHANGE_WOFF_SPAN_TIMEOUT: changeWOFFSpanTimeout
};
});
```

Description of Variables and Functions

| | | |
|---|---|---|
| var WOFF_SPAN_TIMEOUT = 60000; | /** On certain mobile devices there is a problem loading 20+ WOFF fonts per page in under 20 seconds. Due to this we increase the timeout to 60 sec to allow all the WOFF fonts to load before we load the page @type {number} */ | |
| var PDF_SPAN_TIMEOUT = 3000; | /** If we think this is a valid PDF font for the Span test we set the timeout for 3 sec. (A valid font for the span test has to have a non-zero width test character). Occasionally we don't identify a bad font so we have to keep this timeout low @type {number} */ | |
| var BAD_PDF_FONT_TIMEOUT = 1500; | /** If the font doesn't work for the span test, just wait 1.5 sec then load the font. @type {number} */ | |

//===========================================================

-continued

```
// AUX METHODS
//================================================================
function                          /** given a font definition, checks to see if
isPDFFont(fontDefinition) {       the font is a PDF.js font @param
                                  fontDefinition @returns {boolean}
                                  */
function                          /** given a font definition, checks to see if
isBlankFont(fontDefinition) {     that font is the AdobeBlank font @param
                                  fontDefinition @returns {boolean}
                                  */
function                          /** given a font definition, checks to see if
isWOFFFont(fontDefinition) {      that font is a WOFF font @param fontDefinition
                                  @returns {boolean}
                                  */
function                          /** creates the Family List for a font The
makeFamilyList(fontDefinition) {  family list is required when using a font, it
                                  specifies the font family to draw in, as well
                                  as the fallback font example: "Times New
                                  Roman", sans-serif would try and draw in the
                                  TimesNewRoman font, if it wasn't loaded it
                                  would default back to sans-serif @param
                                  fontDefinition @returns {string}
                                  */
function                          /** checks to see if the font has a valid test
hasValidTestChar(fontDefinition)  character. valid test characters are defined
{                                 as those that will pass both the spanTester
                                  and canvasTester @param fontDefinition
                                  @returns {*}
                                  */
function adjustURL(url) {         /** returns a url that has been correctly pre-
                                  pended @param url @returns {string}
                                  */
function                          /** given a testCharacter code, this will
getTestCharFromUnicode(testChar)  convert that code into a character which can
{                                 be used in the canvas and span testers @param
                                  testChar @returns {string | null}
                                  */
function                          /** gets a unique identifier for any font.
getFontHash(fontDefinition) {     currently we're using the font url @param
                                  fontDefinition @returns {*}
                                  */
//================================================================
// FONT LOADING
//================================================================
function loadFont(definition,     /** This is the public facing method, allows
successCallback,                  users to load a font @param definition @param
failureCallback) {                successCallback @param failureCallback
                                  */
var fonts = { };                  /** keeps track of all the fonts we've seen,
                                  indexed by fontHash @type {{ }}
                                  */
function                          /** This will be called multiple times on the
getOrCreateFont(fontDefinition)   same fontDefinition obj so make sure we aren't
{                                 modifying it every time it goes through!
                                  Checks to see if the font is already being
                                  processed, if we've seen it we add the
                                  callbacks to the processed font if we haven't
                                  we create a new font @param fontDefinition
                                  @returns {*}
                                  */
function                          /** Creates a Font object from a font
createFont(fontDefinition) {      definition. each font object has a load
                                  implementation which, when called, will: 1.
                                  load the font data into the fontStyle element
                                  in document.head 2. tests to see when the font
                                  is loaded 3. calls appropriate callbacks when
                                  loaded, or failure callback this
                                  loadImplementation changes based on which font
                                  we are trying to load each of these steps are
                                  chained together using q.js promises @param
                                  fontDefinition @returns {Font}
                                  */
console.log('loading a PDFJS     // PDFJS with bad test char
font with bad test Char ' +      // Sometimes a PDF font will have a test
                                  character that our test
                                  // doesn't like or won't have a test character
                                  at all.
```

| | |
|---|---|
| function changeBaseURL(baseURL) { | // If this is the case we draw once to canvas, wait for 1.5 sec<br>// draw to canvas again and then load the font<br>/** Changes the base URL, this will always be called! So load the blank font after we start loading @param baseURL the url to change to @param debug flag for calling this method to debug<br>*/ |
| function changeWOFFSpanTimeout(timeout) { | /** Changes the WMFL SPAN TIMEOUT Used so when we test we don't have to wait the full timeout @param timeout<br>*/ |

What is claimed is:

1. A method for downloading fonts associated with a document in a client-server architecture, comprising:
on a server comprising a server processor:
parsing the document;
extracting information for reconstructing the document on a client device, including at least font information associated with the document, wherein the font information comprises a font usable to display a page of the document on the client device;
determining whether a valid test character in the font exists, wherein the valid test character is a viewable character;
based on the determination that the valid test character in the font exists, including the valid test character in the font information;
based on the determination that the valid test character in the font does not exist, the valid test character is not included in the font information; and
storing the extracted information in a database;
on the client device that is connected to the server via a network connection:
receiving some or all of the document;
receiving the font information associated with the document;
requesting a processor to load the font included in the font information;
determining whether the valid test character is included in the font information;
based on the determination that the valid test character is included in the font information:
drawing the valid test character on a display screen of the client device;
recording a width of the drawn test character;
determining that the drawn test character was in the font if the width of the drawn test character is not equal to zero; and
determining that the drawn test character was in a fallback font if the width of the drawn test character is equal to zero;
based on the determination that the valid test character is not included in the font information, not drawing the valid test character.

2. The method of claim 1, wherein based on the determination that the drawn test character was in the font, the method further comprises generating, on the client device, a notification that the font was successfully loaded.

3. The method of claim 1, wherein based on the determination that the drawn test character was in the fallback font, the method further comprises:
(a) redrawing the valid test character on the display screen;
(b) recording a width of the redrawn test character;
(c) determining whether the width of the redrawn test character is equal to zero; and
(d) based on the determination that the width of the redrawn test character is equal to zero, repeating (a) to (c).

4. The method of claim 3, wherein based on the determination that the width of the redrawn test character is equal to zero after repeating (a) to (c) of claim 3 for a predetermined number of times, the method further comprises generating, on the client device, a notification that the font failed to load.

5. The method of claim 1, wherein based on the determination that the valid test character is not included in the font information, the method further comprises:
drawing a character on the display screen;
waiting for a predetermined amount of time; and
redrawing the character on the display screen.

6. The method of claim 1, wherein the drawing of the valid test character comprises drawing the valid test character on an invisible portion of the display screen.

7. A method carry out by a client device, the method comprising:
receiving at least a portion of a document stored on a server;
receiving font information associated with the document, wherein the font information comprises a font usable to display a page of the document;
determining whether a viewable test character in the font is included in the received font information;
requesting a processor to load the font;
based on the determination that the viewable test character in the font is included in the received font information:
drawing the viewable test character on a display screen;
recording a width of the drawn test character;
determining that the drawn test character was in the font if the width of the drawn character is not equal to zero;
determining that the drawn test character was in a fallback font if the width of the drawn test character is equal to zero; and
based on the determination that the viewable test character is not included in the font information, not drawing the viewable test character.

8. The method of claim 7, wherein based on the determination that the drawn test character was in the font, the method further comprises generating a notification that the font was successfully loaded.

9. The method of claim 7, wherein based on the determination that the drawn test character was in the fallback font, the method further comprises:
redrawing the viewable test character on the display screen;

recording a width of the redrawn test character;
determining whether the width of the redrawn test character is equal to zero; and
based on the determination that the width of the redrawn test character is not equal to zero, determining that the redrawn test character was in the font.

10. The method of claim 7, wherein based on the determination that the drawn test character was in the fallback font, the method further comprises:
(a) redrawing the viewable test character on the display screen;
(b) recording a width of the redrawn test character;
(c) determining whether the width of the redrawn test character is equal to zero; and
(d) based on the determination that the width of the redrawn test character is equal to zero, repeating (a) to (c).

11. The method of claim 10, based on the determination that the width of the redrawn test character is equal to zero after repeating (a) to (c) of claim 10 for a predetermined number of times, the method further comprises generating a notification that the font failed to load.

12. The method of claim 7, wherein based on the determination that the viewable test character is not included in the font information, the method further comprises:
drawing a character on the display screen;
waiting for a predetermined amount of time; and
redrawing the character on the display screen.

13. The method of claim 7, wherein the drawing of the viewable test character comprises drawing the viewable test character on an invisible portion of the display screen.

14. An electronic device comprising:
a receiver that receives at least a portion of a document stored on a server and receives font information associated with the document, wherein the font information comprises a font usable to display a page of the document;
a display screen; and
a processor electronically coupled to the receiver and the display screen, the processor:
determines whether a viewable test character in the font is included in the received font information;
based on the determination that the viewable test character in the font is included in the received font information:
draws the viewable test character on a display screen;
records a width of the drawn test character;
determines that the drawn test character was in the font if the width of the drawn character is not equal to zero; and
determines that the drawn test character was in a fallback font if the width of the drawn test character is equal to zero; and
based on the determination that the viewable test character is not included in the font information, does not draw the viewable test character.

15. The electronic device of claim 14, wherein based on the determination that the drawn test character was in the font, the processor further generates a notification that the font was successfully loaded.

16. The electronic device of claim 14, wherein based on the determination that the drawn test character was in the fallback font, the processor further:
redraws the viewable test character on the display screen;
records a width of the redrawn test character;
determines whether the width of the redrawn test character is equal to zero; and
based on the determination that the width of the redrawn test character is not equal to zero, determines that the redrawn test character was in the font.

17. The electronic device of claim 14, wherein based on the determination that the drawn test character was in the fallback font, the processor further:
(a) redraws the viewable test character on the display screen;
(b) records a width of the redrawn test character;
(c) determines whether the width of the redrawn test character is equal to zero;
(d) based on the determination that the width of the redrawn test character is equal to zero, repeats (a) to (c).

18. The electronic device of claim 17, wherein based on the determination that the width of the redrawn test character is equal to zero after repeating (a) to (c) of claim 17 for a predetermined number of times, the processor further generates a notification that the font failed to load.

19. The electronic device of claim 14, wherein based on the determination that the viewable test character is not included in the font information, the processor:
draws a character on the display screen;
waits for a predetermined amount of time; and
redraws the character on the display screen.

20. The electronic device of claim 14, wherein the processor draws the viewable test character on an invisible portion of the display screen.

* * * * *